(12) United States Patent
Bill

(10) Patent No.: US 12,730,022 B2
(45) Date of Patent: Sep. 8, 2026

(54) LANDING GEAR LOAD SENSING APPARATUS AND METHODS

(71) Applicant: AIRBUS OPERATIONS LIMITED, Bristol (GB)

(72) Inventor: Andrew Bill, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 365 days.

(21) Appl. No.: 18/485,905

(22) Filed: Oct. 12, 2023

(65) Prior Publication Data

US 2024/0125663 A1 Apr. 18, 2024

(30) Foreign Application Priority Data

Oct. 13, 2022 (GB) ..................................... 2215153

(51) Int. Cl.
*G01L 5/16* (2020.01)
*B64C 25/32* (2006.01)
*B64D 45/00* (2006.01)

(52) U.S. Cl.
CPC ................ *G01L 5/16* (2013.01); *B64C 25/32* (2013.01); *B64D 45/00* (2013.01); *B64D 2045/008* (2013.01)

(58) Field of Classification Search
CPC ... G01L 3/108; G01L 3/08; G01L 5/16; G01L 5/0004; G01G 19/07; G01B 7/18
See application file for complete search history.

(56) References Cited

U.S. PATENT DOCUMENTS 2,992,860 A * 7/1961 Hirzel ..................... B60T 8/171 303/191
3,426,586 A 2/1969 Kadlec
3,625,053 A * 12/1971 Laimins ................. G01G 19/07 244/76 R
3,878,908 A * 4/1975 Andersson ............. G01G 19/12 177/136

(Continued)

FOREIGN PATENT DOCUMENTS

CA 2 576 805 A1 3/2006
DE 24 06 039 A1 8/1975

(Continued)

OTHER PUBLICATIONS

Concord Landing Gear Braking Systems, (https://www.heritageconcorde.com/landing-gear-braking-systems), Apr. 19, 2017.

(Continued)

*Primary Examiner* — Tran M. Tran
(74) *Attorney, Agent, or Firm* — Nixon & Vanderhye, PC

(57) ABSTRACT

A sensor carrier for sensing forces acting upon an axle of an aircraft landing gear assembly is disclosed being arranged to fit within the axle and includes an end coupling for fixing to one end of the axle, and a central coupling for fixing to a central portion of the axle where the axle attaches to a main leg of the assembly. The sensor carrier includes a sensor arrangement arranged to detect strain occurring between the end coupling and the central coupling so that in use, the sensor arrangement indicates strain occurring between the end of the axle and the main leg of the aircraft.

20 Claims, 4 Drawing Sheets

(56) References Cited

U.S. PATENT DOCUMENTS 3,900,828 A * 8/1975 Lage .................. G01G 19/07 73/146
3,975,685 A 8/1976 Bielsten et al.
4,269,070 A * 5/1981 Nelson .................. G01L 1/14 73/779
4,312,042 A * 1/1982 Bateman .................. G01M 1/125 177/136
4,550,385 A * 10/1985 Pulk .................. G01G 19/07 702/140
4,587,854 A * 5/1986 Fry .................. E02B 17/0818 73/862.31
RE32,746 E * 9/1988 Nelson .................. G01G 19/12 73/779
5,205,514 A * 4/1993 Patzig .................. G01G 19/07 177/136
5,239,137 A * 8/1993 Patzig .................. G01G 23/01 177/136
5,257,756 A * 11/1993 Patzig .................. G01G 19/07 244/103 R
5,585,571 A * 12/1996 Lonsdale .................. B60C 23/0428 73/862.321
5,965,849 A * 10/1999 Ikoma .................. G01L 5/0004 177/136
6,237,406 B1 * 5/2001 Nance .................. G01G 19/07 73/178 T
6,293,141 B1 * 9/2001 Nance .................. G01M 1/125 73/178 T
6,651,518 B1 * 11/2003 Miyazaki .................. G01L 5/1627 73/862.044
7,484,424 B2 * 2/2009 Pradier .................. G01G 19/07 73/802
7,578,199 B2 * 8/2009 Giazotto .................. B64C 25/58 73/800
7,683,274 B2 * 3/2010 Dellac .................. G01L 5/0004 73/862.631
7,770,461 B2 * 8/2010 Perriard .................. G01L 5/0004 73/862.44
7,775,093 B2 * 8/2010 Cooper .................. G01M 5/0041 403/2
8,055,396 B2 * 11/2011 Yates .................. B64D 45/00 340/960
8,181,532 B2 * 5/2012 Schmidt .................. G01M 11/08 73/800
8,226,030 B2 * 7/2012 Mast .................. B64C 25/52 244/108
8,262,019 B2 * 9/2012 Schmidt .................. G01G 19/07 244/100 R
9,151,697 B2 * 10/2015 Magnin .................. G01M 17/04
9,261,419 B2 * 2/2016 Kempainen .................. G01G 3/1402
9,272,792 B2 * 3/2016 Hodgkinson .................. B64D 45/0005
9,599,526 B2 * 3/2017 Mercat .................. B62J 45/423
10,549,847 B2 * 2/2020 Dauphin .................. B64C 25/505
10,589,848 B2 * 3/2020 Dauphin .................. B64C 25/34
10,654,564 B2 * 5/2020 Cokonaj .................. B64D 45/0005
10,837,823 B2 * 11/2020 Henrion .................. G01G 7/02
10,899,435 B2 * 1/2021 Baird .................. B64D 45/0005
11,513,028 B2 * 11/2022 Bellera .................. G01G 21/30
2006/0266561 A1 11/2006 Dellac et al.
2009/0210173 A1 * 8/2009 Arms .................. G01L 5/24 702/42
2013/0192903 A1 * 8/2013 Dubois .................. G01G 7/02 177/136
2015/0316438 A1 * 11/2015 Nance .................. B64D 45/00 701/3
2023/0095069 A1 * 3/2023 Bill .................. B64C 25/405 244/111
2024/0175770 A1 * 5/2024 Algüera .................. B60S 9/08

FOREIGN PATENT DOCUMENTS

EP 1 660 851 5/2006
WO 2005/022098 A1 3/2005
WO 2006067442 A1 6/2006

OTHER PUBLICATIONS

Concorde Top Forward Engineers Panel, (https://www.heritageconcorde.com/top-fwd-engineers-panel), Apr. 19, 2017.
Boeing 747: Strain gauge type sensor, bonded to LG structure for the purposes of sensing too-high a braking torque and limiting the brake pressure, Jan. 11, 2006.
Extended European Search Report for EP Application No. 23202337.4, nine pages, dated Mar. 5, 2024.
Combined Search and Examination Report for GB2215153.4 dated Apr. 13, 2023, 6 pages.
ALGeSMo (Advanced Landing Gear Sensing and Monitoring), Publishable report on project technical results, <http://www.halcyon-optical.co.uk/ALGESMO%20Report.pdf>, 17 pages, Oct. 2020.

* cited by examiner

LANDING GEAR LOAD SENSING APPARATUS AND METHODS

CROSS RELATED APPLICATION

This application claims priority to United Kingdom Patent Application GB 2215153.4, filed Oct. 13, 2022, the entire contents of which is hereby incorporated by reference.

BACKGROUND OF THE INVENTION

The present disclosure relates to apparatus, e.g. sensors, and methods for sensing loads at aircraft landing gear assemblies. More particularly, but not exclusively, the present disclosure concerns sensors and methods for sensing braking torque at an aircraft landing gear assembly.

Many commercial aircraft are fitted with landing gear sensor systems to monitor events such as aircraft braking action and hard landings. For example on some Boeing 747 aircraft main landing gear (MLG) assemblies, and on Concorde, strain gauge sensors are employed to monitor braking torque, such that if the sensed torque is too high the brake pressure is reduced.

In the case of the B747 the MLG is a four-wheel (multi-axle) bogie. A torque pin is fitted to a central point of the bogie, with sensors coupled between the pin and torque lugs on each of the wheel attachment points in order to 'resolve' the sensed torque to a single point on the bogie.

For smaller commercial aircraft such as single-aisle narrow body passenger aircraft, the MLG comprise single-axle landing gear assemblies, typically with two wheels. Unlike a multi-axle bogie, this arrangement does not provide a single point where the torque is resolved and where strain gauge sensors may be easily mounted. A large number of sensors or a significant redesign of single-axle landing gear assemblies would likely be required.

Test-aircraft use strain gauges mounted externally at various places on a landing gear assembly for testing, but these are difficult to bond to the exterior of the landing gear assembly and they require extensive calibration. This is impractical for commercial air transport operations, not least because in the event of sensor failure the landing gear assembly may need to be removed and sent away for sensor change or repair, causing unwanted expense and delay.

It has been previously proposed to integrate load and torque sensors into landing gear structure to provide load measurements as part of the ALGeSMo project. ALGeSMo (Advanced Landing Gear Sensing and Monitoring) was a European Union Joint Technology Initiative (Clean Sky 2) which concerned an optically-based load monitoring system using Fibre Bragg Grating ("FBG") technology. The proposal requires a bonding and installation procedure for locking FBG sensors within the axle of the landing gear. This procedure can be time-consuming.

The present invention seeks to mitigate one or more of the above-mentioned problems. Alternatively or additionally, the present invention seeks to provide improved landing gear load sensing apparatus and associated methods for aircraft landing gear assemblies.

SUMMARY OF THE INVENTION

According to a first aspect of the invention there is provided a sensor carrier for use within an axle of an aircraft landing gear assembly. The sensor carrier includes a first coupling for coupling the carrier to a first location of the axle, and a second coupling for coupling the carrier to a second location of the axle axially spaced apart from the first location. The sensor carrier includes at least one sensor which is arranged to detect strain between the first coupling and the second coupling of the sensor carrier. In this way the at least one sensor is configured such that when the sensor carrier is within the axle and coupled to the axle by the first and second couplings respectively, strain occurring between the first location and the second location of the axle is detected by the at least one sensor.

In this way strain occurring at the axle due to forces such as braking torque is replicated within the sensor carrier via the first and second couplings and is sensed by the at least one sensor. A resulting signal indicating the sensed strain may be processed and transmitted to other systems of the aircraft, or stored in memory.

For the avoidance of doubt, 'axially spaced apart' in this context means that, when the sensor carrier is in use within the axle, the couplings are spaced apart from each other in a direction along the axis of the axle, which is the axis of rotation of a wheel when coupled to the axle. It will also be appreciated that the first and second couplings of the sensor carrier are also longitudinally spaced apart from each other along a longitudinal direction of the sensor carrier. In embodiments in which the sensor carrier is within the axle, the longitudinal direction of the sensor carrier is aligned with (e.g. parallel and coincident with—i.e. coaxial) the axis of the axle. The sensor carrier is typically elongate, such that its length is aligned with the longitudinal direction of the sensor carrier.

There are several potential advantages to embodiments in accordance with this arrangement. Firstly the sensor carrier (which may be in the form of a sensor pack, for example) does not require any external components to be fitted to the landing gear assembly, and can be housed within the axle. Secondly the sensor carrier does not require any significant modifications to the landing gear assembly or to any other part of the aircraft in order to be installed. Thirdly, in the event of failure of the sensor carrier or one of its components, the sensor carrier can be easily replaced without necessitating the removal of a wheel or the replacement of the entire landing gear assembly. Fourthly, the provision of the first and second couplings and the sensor carrier enables the sensor or sensors to be installed in the axle without needing to be directly bonded to any aircraft structure (instead the sensors are directly bonded to structure of the sensor carrier for example). This can assist with reducing the amount of, or avoiding completely, calibration of the sensor in situ on the aircraft.

It will be appreciated that the sensor carrier of embodiments therefore obviates the need for expensive and complex redesign of single-axle, two-wheel landing gear assemblies and/or eases installation and subsequent use of the sensor carrier on the aircraft.

Preferably the sensor carrier has multiple sensors (e.g. two or more) arranged within the sensor carrier between the first coupling and the second coupling.

The sensor carrier body may be generally cylindrical in shape (i.e. a tube), at least in part, and adapted to fit within the hollow cavity of the axle. The cylindrical shape may have an outer diameter that is at least half of, preferably at least 75% of, and possibly substantially equal to, the inner diameter of the hollow axle. The sensors of the sensor carrier may be arranged in a distributed concentric pattern around an internal curved surface of the sensor carrier. The distribution and number of the sensors ensures that the sensor carrier is able to sense strain occurring in any direction within the sensor carrier.

The sensor carrier body may be in the form of a cage. The cage may be generally cylindrical. For example, the cage may have cylindrical (hooped) ends with ribs therebetween incorporating the sensors. The first and second couplings may be provided at the cylindrical ends. Alternatively, the second coupling may be provided at a central cylindrical (hoop) section of the cage. The ribs may be recessed from the notional envelope of the generally cylindrical shape defined by the cylindrical ends, such that the sensors may be mounted on the exterior surface of the ribs.

The series of sensors may also provide for redundancy so that if one or more sensors should fail, the sensor carrier may to continue to sense strain occurring at the axle.

Preferably the sensor carrier includes a third coupling for coupling the sensor carrier to a third location of the axle axially spaced apart from the first and second locations, and at least one further sensor arranged to detect strain occurring between the second location and the third location of the axle. The at least one further sensor is configured such that when the sensor carrier is coupled to the axle, strain occurring between the second location and the third location of the axle is detected by said at least one further sensor.

The second location may be situated between the first and the third locations. For example, the first location may be proximate a first end of the axle, and the third location may be proximate a second end of the axle opposite the first, with the second location being situated between the first and second ends of the axle respectively.

The first and third locations are preferably disposed in opposite axial directions away from the second coupling.

The first and third locations may coincide with the locations on the axle of the wheel nuts, such that forces acting on the axle by the wheels are accurately sensed by the sensor carrier.

It will be appreciated that having a limited number of couplings (for example only two, or optionally three couplings) which couple the sensor carrier to the axle, enables straightforward and efficient installation and/or removal of the sensor carrier. Preferably, there are ten or fewer (more preferably six or fewer) such couplings that perform the function of anchoring the sensor carrier at fixed locations to the axle. Each coupling may comprise a bolt, which for example extends through the axle from the exterior of the axle to the interior of the axle. Such a bolt may extend from the exterior of the axle on one side of the axle, via the interior of the axle, to the exterior of the axle on the opposite side of the axle.

Preferably the sensor carrier has a number of further sensors arranged within the sensor carrier between the second coupling and the third coupling. These further sensors may be arranged in a distributed concentric pattern, around an internal curved surface of the sensor carrier.

The second location of the axle preferably corresponds to a connection between the axle and a landing gear leg.

The second location may be the interface between the axle and the landing gear leg, and therefore the point through which forces being applied to the wheels of the landing gear assembly are transmitted to the landing gear leg.

The sensor carrier preferably comprises at least one central sensor disposed within the sensor carrier proximate to the second coupling, the at least one central sensor being arranged to cooperate with the at least one sensor and/or the at least one further sensor.

Preferably the at least one central sensor comprises a number of central sensors arranged within the sensor carrier proximate the central coupling. These central sensors may be arranged in a distributed concentric pattern, around an internal curved surface of the sensor carrier. The distribution of the further sensors preferably ensures that the sensor carrier is able to sense strain occurring around the curved surface of the sensor carrier.

The sensors may be arranged in different orientations and locations depending on the strain to be sensed.

Preferably the strain detected by the sensor carrier includes torsional strain relating to the braking action of wheels attached to the first end of the axle.

In this way braking torque control may be intelligently applied to each wheel of the aircraft, in order to manage aircraft functions such as optimised deceleration, brake wear control, brake health monitoring, brake temperature distribution and control, oxidation prevention and other functions.

The strain detected by the sensor carrier preferably includes vertical strain caused by forces acting on the axle during landing and take-off of the aircraft.

Such vertical strain sensing allows hard-landing and fatigue life monitoring, as well as weight and balance determination and tire deflection monitoring.

It will be appreciated that the sensor carrier is able to detect strain in other directions. For example this may include axle drag strain which allows runway surface monitoring and fatigue life monitoring.

It will be appreciated from the above, that the sensor carrier may carry multiple sensors distributed both axially and circumferentially about the body of the sensor carrier. The outer diameter of the sensor carrier may vary along its axis. As such, while it may be the case that all such sensors are provided on an interior surface of the sensor carrier, there may be some embodiments, in which the outer diameter of the sensor carrier is significantly less that the inner diameter of the axle, thus allowing one or more sensors to be mounted in the axle but on an outer surface of the sensor carrier.

It will be appreciated from the above, that the sensor carrier may carry multiple sensors distributed in such a way as to allow brake torque to be measured, as well as other loads, such as for example weight on wheels, vertical loads, and/or torsional loads about an axis transverse to the axis of the axle, and the like.

The sensor carrier may incorporate a wheel speed tachometer. Alternatively, or additionally, the sensor carrier may incorporate a brake cooling fan motor. Alternatively, or additionally, the sensor carrier may incorporate a tire pressure indication system. Having a sensor carrier incorporating one or more such extra components may facilitate the convenient integration of several other components and sensing systems into the sensor carrier.

The sensor carrier is preferably made of composite material. For example, the body of the sensor carrier may be made substantially entirely from high temperature composite materials such as Polyetheretherketone (PEEK). Alternatively, or additionally the sensor carrier body may be made primarily of a metal such as stainless steel or aluminium.

The composite material used and the shape of the sensor carrier are chosen for their strain properties, such that the strain experienced by the sensor carrier can reliably and accurately replicate the strain experienced by the axle, for example such that it accurately provides a facsimile of the strain occurring between the end(s) and the centre of the axle.

The sensor carrier is preferably a line replaceable unit, that feature being enabled for example by the reusable and modular nature of the sensor carrier and the number and simplicity of the couplings.

It will be appreciated that the sensor carrier may be provided separately from the axle in which it is configured to be coupled. Alternatively, the sensor carrier may be provided within an aircraft wheel axle, the sensor carrier being coupled to the axle at the first location by the first coupling and coupled to the axle at the second location by the second coupling, the first location and the second location being spaced apart in a direction parallel to the longitudinal axis of the axle.

According to a second aspect of the invention a landing gear assembly is provided comprising: a leg; an axle coupled to the leg, the axle containing the sensor carrier according to the first aspect of the present invention; and optionally at least one wheel mounted on the axle.

The landing gear assembly may be for a main landing gear (MLG) or for a nose landing gear (NLG). The landing gear assembly may comprise a single axle or multiple axles coupled via a bogie. The axles may be stub axles for mounting a wheel at only one end.

According to a third aspect of the invention an aircraft is provided which includes a landing gear assembly incorporating the sensor carrier.

The aircraft is preferably a passenger aircraft. The passenger aircraft preferably comprises a passenger cabin comprising a plurality of rows and columns of seat units for accommodating a multiplicity of passengers. The aircraft may have a capacity of at least 20, more preferably at least 50 passengers, and more preferably more than 50 passengers. The aircraft may be a commercial aircraft, for example a commercial passenger aircraft, for example a single aisle or twin aisle aircraft.

According to a fourth aspect of the invention a method for determining forces acting on an axle of an aircraft landing gear assembly is provided. The method includes sensing strain occurring at a sensor carrier located within the axle, the sensor carrier being coupled between two axially distant locations of the axle. In this way the sensed strain at the sensor carrier provides an indication of strain occurring between the two axially spaced apart locations of the axle, and in embodiments can therefore be related to braking torque, vertical loads, and/or other loads experienced by the axle.

The sensor carrier (or pack) may include a number of strain sensors distributed internally within the sensor carrier.

According to a fifth aspect of the invention a method for replacing a sensor pack in an axle of an aircraft landing gear assembly is provided, the sensor pack being coupled between two axially spaced apart locations of the axle, for example with the use of reusable and removable fixings. The method includes the steps of: decoupling the sensor pack from the two axially spaced apart locations of the axle; removing the sensor pack from the axle; inserting a replacement sensor pack in the axle; and coupling the replacement sensor pack to the two axially spaced apart locations of the axle, for example with the same, or different, fixings.

In this way the sensor pack/carrier may be quickly and easily replaced in the event of a component failure, without requiring a major maintenance event. It will be appreciated that the replacement carrier preferably does not require any specific calibration or configuration steps other than those that are performed automatically by the carrier or by other aircraft systems.

Prior to step of inserting the replacement sensor pack, the method preferably further comprises the step of calibrating the replacement sensor pack, and optionally, of testing the replacement sensor pack. In this way the replacement sensor pack may be 'plug-and-play' ready to facilitate rapid replacement and therefore aircraft dispatch in the event of a sensor pack failure. The replacement sensor pack may be a line replaceable unit.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

Figure 1:
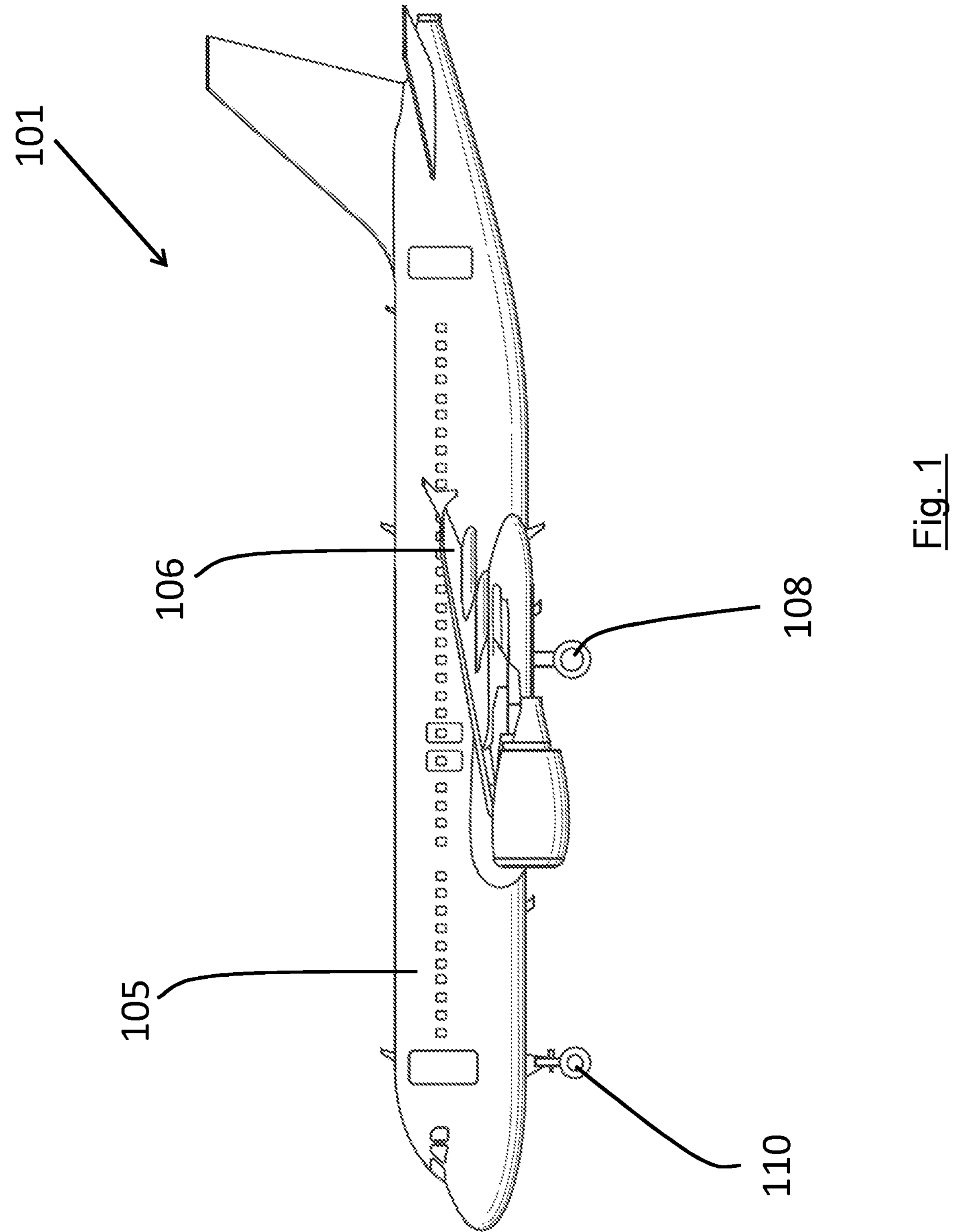
FIG. 1 shows an aircraft having landing gear assemblies with sensor carriers according to an embodiment of the invention.

FIG. 1 shows an aircraft 101 comprising a pair of wings 106 and a fuselage 105. The aircraft 101 is supported on the ground by two main landing gear assemblies (MLG) 108 and a nose landing gear assembly (NLG) 110. The MLG also provides braking action for the aircraft 101 during taxi, landing and during a rejected take-off.

Figure 2:
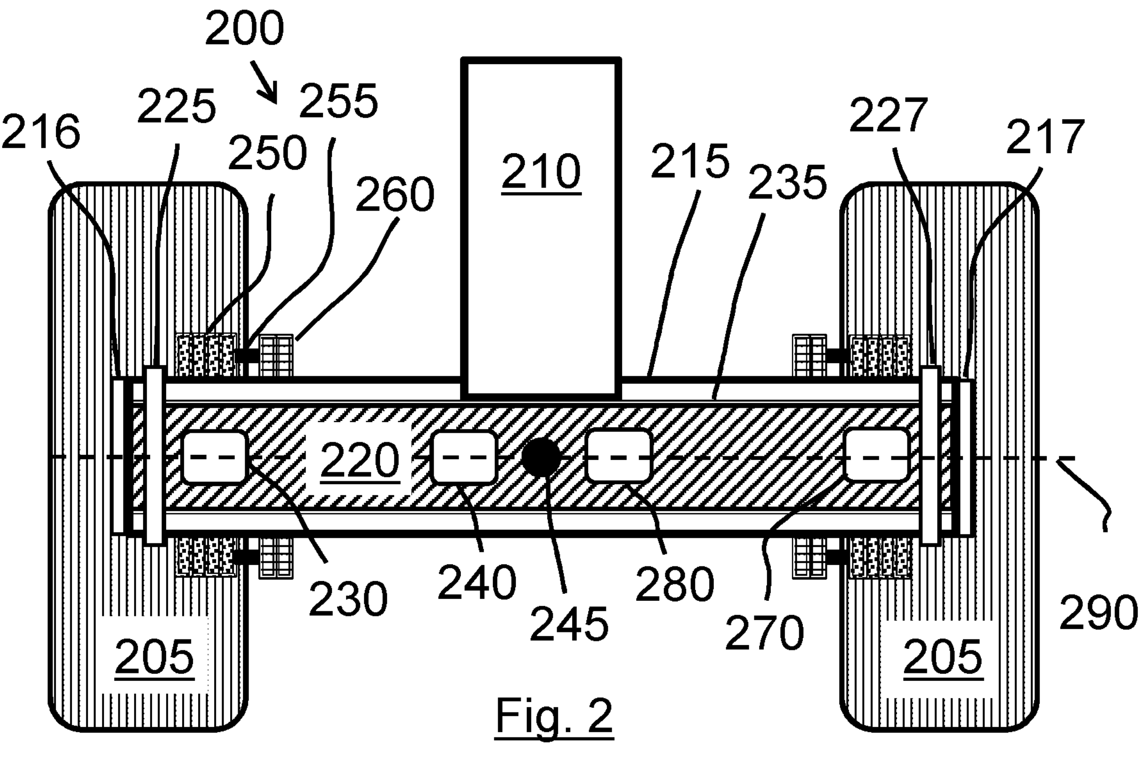
FIG. 2 shows a landing gear assembly incorporating a sensor carrier according to a first embodiment of the invention.

Referring now also to FIG. 2 there is shown a simplified illustrative drawing of a landing gear assembly 200 attached to the aircraft 101 of FIG. 1. The landing gear assembly 200 has a single axle 215 and the example shown corresponds to the MLG assembly 108 of the aircraft 101. The landing gear assembly 200 includes a pair of wheels 205 coupled to a main leg 210 via the axle 215. The axle 215 has a primary axis 290 which extends between the wheels 205. Forces acting upon the wheels 205 due to contact with the ground (or with another object or surface directly contacting the wheels 205), may cause resulting movement at the axle 215 due to strain.

A sensor carrier 220 is fitted within the axle 215 along the primary axis 290. The sensor carrier 220 may be in the form of a generally cylindrical tube or cartridge, and has a body 235 made of composite material suitable for the landing gear assembly environment (to be further described below). The sensor carrier 220 is coupled at each end of the axle 215 via wheel nuts 225 and 227 respectively, and is further anchored to the centre of the axle 215 via a central bolt 245. Hub caps 216 and 217 are fitted at each end of the axle 215, and in some implementations these may also be associated with a brake cooling fan (not shown), to be further described below.

The sensor carrier 220 includes a main sensor 230, which may be a strain-gauge sensor, a Fibre Bragg Grating (FBG) etched optical fibre sensor, or a Surface Acoustic Wave (SAW) sensor. The main sensor 230 is bonded to a surface of the body 235 of the sensor carrier 220, along the primary axis 290 near the wheel nut 225, and is arranged to sense strain occurring within the body 235 of the sensor carrier 220 between the nut 225 and the central bolt 245.

The sensor carrier 220 is self-contained, does not require any external components to be fitted to the landing gear assembly 200 and is housed within the protection of the inside of the axle 215. Furthermore the sensor carrier 220 does not require any significant modifications to the landing gear assembly 200 or to any other part of the aircraft in order to be installed.

It will be appreciated that in the event of failure of the sensor carrier 220 or one of its components, the sensor carrier 220 can be easily replaced without necessitating removal or replacement of the entire landing gear assembly 200, and so it is a line replaceable unit.

In addition the provision of the couplings at wheel nuts 225 and 227 and the coupling at the central bolt 245 central allows the sensor to be installed in the axle without needing to be directly bonded to any aircraft structure (instead being directly bonded to the body 235 of the sensor carrier 220), which can assist with reducing the amount of, or avoiding completely, calibration of the sensor in situ on the aircraft 101.

The sensor carrier 220 also includes an inner sensor 240, which also may be a strain-gauge sensor, a Fibre Bragg Grating (FBG) optical fibre sensor, or Surface Acoustic Wave (SAW) sensor. The inner sensor 240 is also bonded to a surface of the body 235 of the sensor carrier 220, spaced apart from the main sensor 230 along the primary axis 290 near the centre of the axle 215, and cooperates with the main sensor 230. All sensors are directly bonded to a surface of the body 235 of the sensor carrier 220, and are each configured to detect strain of the body of the sensor carrier 220 local to the sensor.

Brakes 250 associated with the wheel 205 are coupled via connecting pins 255 to a brake torque flange 260 disposed around the axle 215. When the brakes 250 are applied, friction between the brakes 250 and the wheel 205 causes torsion forces to be transferred through the connecting pins to the brake torque flange 260, which in turn transmits torsional forces to the axle 215. These torsional forces cause temporary deformation of the axle 215.

A further main sensor 270, which may also be a strain-gauge sensor, a Fibre Bragg Grating (FBG) optical fibre sensor, or Surface Acoustic Wave (SAW) sensor, is bonded to a surface of the body 235 of the sensor carrier 220, spaced apart from the main sensor 230 along the primary axis 290, near the wheel nut 227. The further main sensor 270 is arranged to sense strain occurring at the opposite end of the axle 215 between the wheel nut 227 and the central bolt 245 in a similar manner to that of the main sensor 230.

The sensor carrier 220 also includes a further inner sensor 280, which also may be a strain-gauge sensor, a Fibre Bragg Grating (FBG) optical fibre sensor, or Surface Acoustic Wave (SAW) sensor. The further inner sensor 280 cooperates with the further main sensor 270 to determine strain occurring within the sensor carrier 220.

For the sake of clarity, the brakes 250, connecting pins 255 and torque plates 260 of the right-hand side of FIG. 2 are not labelled, but it will be appreciated that these elements mirror those shown on the left-hand side thereof.

It will be appreciated that the sensor carrier 220 may also be provided with only the main sensor 230, or with the main sensor 230 and the inner sensor 240, in which case only strain on the left-hand side of the axle will be sensed.

Since the sensor carrier 220 is only held within the axle 215 by the two wheel nuts 225 and 227 and the central bolt 245, it may be easily replaced in the event of a component failure by simply removing the hubcap 216, removing the wheel nuts 225 and 227 and the central bolt 245, disconnecting any cabling (not shown) and sliding the sensor carrier 220 out of the axle 215. Further details of the removal and replacement of the sensor carrier 220 are described below. The sensor carrier 220 or 300 described above may also incorporate other components and sensors associated with the landing gear assembly. These may include a wheel speed tachometer, a brake cooling fan motor, and a Tire Pressure Indicating System (TPIS). These systems may all usefully be housed within the sensor carrier 220 or 300.

As well as meeting the full RTCA (Radio Technical Commission for Aeronautics) DO-160 environmental qualification testing requirements (temperature, vibration, fluid, EMI/EMC etc. . . . ), the sensor carrier 220 or 300 and its components will be specified to operate within an ambient temperature range of −55° C. to +175° C. Temperatures greater than this may be encountered as a result of a HERTO (High Energy Rejected Take-Off), of up to 250° C., and while the sensor carrier 220 is not required to function between 175° C. and 250° C., it must be robust enough to not mechanically fail. The sensor carrier 220 or 300 is also fabricated to be vibration tolerant, and also to resist degradation in case of contact with fluids and liquids found in the vicinity of the landing gear assembly 200, such as fuel, hydraulic fluid and grease.

In use, the aircraft 101 may have a sensor carrier 220 in an axle of each main landing gear 108. Contact between the wheels 205 and the ground (not shown) when the aircraft is not at rest, causes the wheels 205 to rotate.

Referring now to the left side of FIG. 2, during braking, friction acting on the wheels 205 by the brakes 250 causes a reactionary braking torque which is transferred via connecting pins 255 and the brake torque flange 260 to the axle 215. This torque creates shear stress forces which result in torsional deformation (strain) of the axle 215 during braking. This deformation is also experienced by the body 235 of the sensor carrier 220 between the wheel nut 225 and central bolt 245, and this corresponding deformation of the sensor carrier 220 is sensed by the main sensor 230 and inner sensor 240. These are instrumented to correlate to their sensed strain to the strain occurring at the left-hand side of the axle 215 due to the braking event, and thus provide an indication of the braking torque acting upon the axle 215.

In a similar way the sensors 270 and 280 are arranged to sense the torsional deformation occurring in the sensor carrier 220 between the wheel nut 227 and the central bolt 245, corresponding to the strain occurring at the right-hand side of the axle 215 of FIG. 2 due to the braking event.

The sensors 230, 240, 270 and 280 are linked to a control unit (not shown) of the aircraft 101 via cables (also not shown). The control unit is arranged to receive signals from the sensors 230, 240, 270 and 280, which indicate the strain (and therefore the braking torque) occurring at the axle 215. The control unit may also receive signals from other aircraft systems and sensors (not shown) relating to speed, ambient temperature, etc.

The control unit may contain a processor, memory and other means for processing the received signals, for providing control signals to control systems and functions of the aircraft 101, and for providing stored data for future use. For example hard landing events may be captured and recorded, calibration parameters may be updated either manually or automatically, Weight and Balance computations including CofG (Centre of Gravity) determination may be performed, and health monitoring of landing gear components may also be provided.

The sensor carrier 220 may be calibrated before being fitted to the aircraft, and further calibration and testing may be performed immediately after fitting (with a known aircraft weight). The control unit may be further arranged to perform in-flight calibration steps of the sensor carrier 220 during certain phases of flight, such as when wheel brakes are applied after take-off.

The control unit is thus able to provide functions such as optimal brake energy distribution, optimised deceleration, brake wear control and health monitoring, brake temperature distribution and control, and oxidation prevention.

It will also be appreciated that in addition to sensing braking torque, the above sensor arrangement may also detect strain at the axle 215 resulting from other forces such as vertical and drag loads applied to the axle 215.

For example during a landing event, forces transferred from the wheels 205 when they come in contact with the ground are transferred to the axle 215, which may in turn cause deformation (strain) of the axle 215 in a vertical sense. Such deformation leads to corresponding deformation occurring in the sensor carrier 220 which is sensed by the sensors 230, 240, 270 and 280 and conveyed to the control unit.

This may be used by the control unit to detect hard-landings, for Weight and Balance determination purposes, or to monitor other parameters such as fatigue life, tire deflection and runway surface condition.

Figure 3:
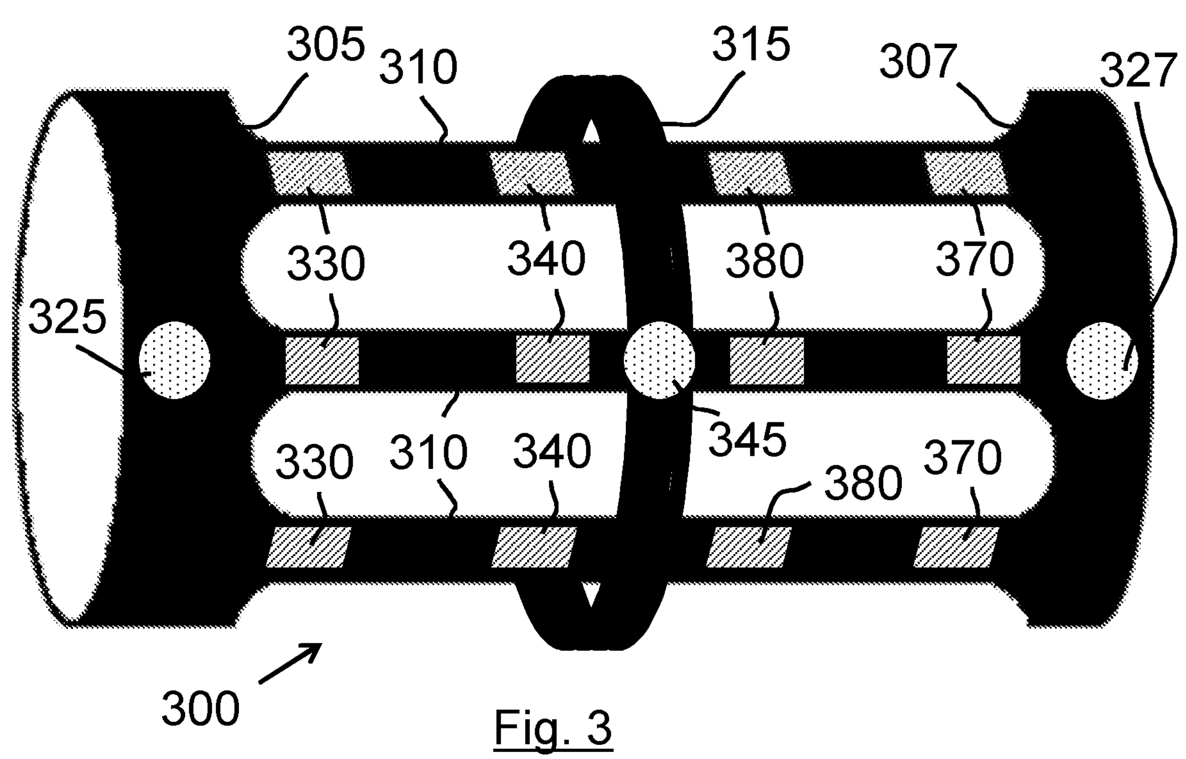
FIG. 3 is a perspective view of a sensor carrier according to a second embodiment of the invention.

Referring now also to FIG. 3, an illustrative perspective view of an alternative sensor carrier 300 is shown. While the sensor carrier 220 of FIG. 2 is entirely cylindrical in shape, the sensor carrier 300 is in the form of a hollow cage having cylindrical end hoops 305 and 307 which are coupled via ribs 310 to a central cylindrical hoop 315. The central hoop 315 has a coupling point 345 which is arranged to receive a central bolt corresponding to the central bolt 245 of FIG. 2.

The end hoops 305 and 307 have coupling points 325 and 327 respectively, which are arranged for coupling to wheel nuts (such as the wheel nuts 225 and 227 of the axle 215 above).

A first series of sensors 330 are disposed within the ribs 310, near the end hoop 305 These correspond to the main sensor(s) 230 of FIG. 2. A second series of sensors 370 are disposed within the ribs 310, near the end hoop 307. These correspond to the further main sensor(s) 270 of FIG. 2. Further series of sensors 340 and 380 respectively are disposed within the ribs, either side of the central hoop 315. These correspond to the inner sensors 240 and the further inner sensors 280 respectively.

Figure 4:
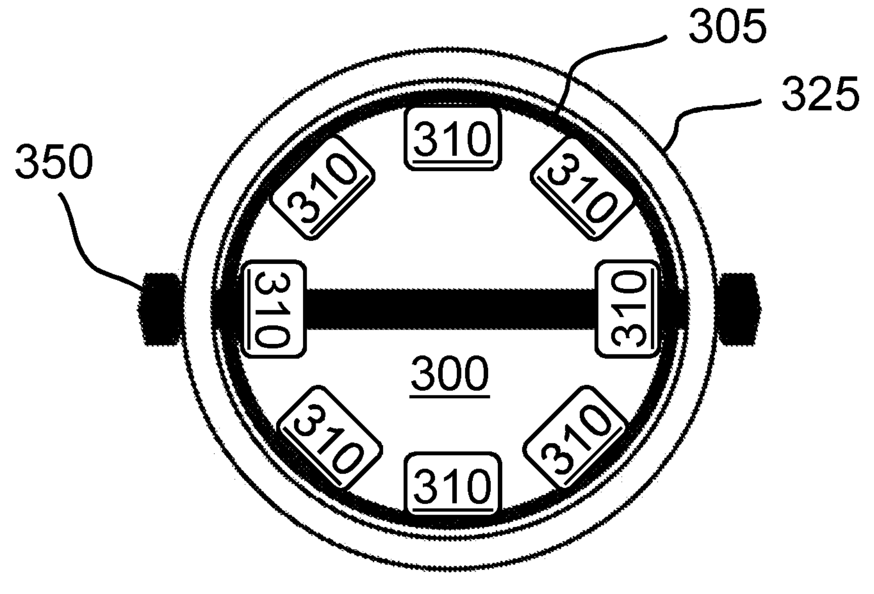
FIG. 4 is an end-view of the sensor carrier of FIG. 3.

Referring now also to FIG. 4, a side-view of an axle 325 is shown, including the sensor carrier 300 of FIG. 3. A central bolt 350 anchors the central hoop 315 (not shown) of the sensor carrier 300 to the centre of the axle 325. Wheel nuts which attach to the coupling points 235 and 327 are omitted for clarity.

The ribs 310 are shown attached to the end hoop 305 and disposed around the circumference of the sensor carrier 300. The ribs are recessed with respect to the notional cylindrical envelope defined by the cylindrical hoops 305 and 307, such that they are spaced apart from the internal surface of the axle 325. As will be appreciated, each of the eight ribs 310 incorporates a sensor 330, 340, 370 and 380 (not shown in FIG. 4) which is a total of 64 sensors in all.

It will be appreciated that arranging this number of sensors in a circumferential pattern as shown in FIGS. 3 and 4 within the body of the sensor carrier 300 ensures that the total resultant strain acting on the axle 315 is sensed within the sensor carrier 300, and that there is sufficient redundancy should one of the series of sensors fail.

It will also be appreciated that since the ribs 310 are slightly recessed from the inner surface of the axle 325 between the end hoops 305, 307 and the central hoop 315, the sensors 330, 340, 370 and 380 may be mounted on the exterior surface of the ribs 310.

Figure 5:
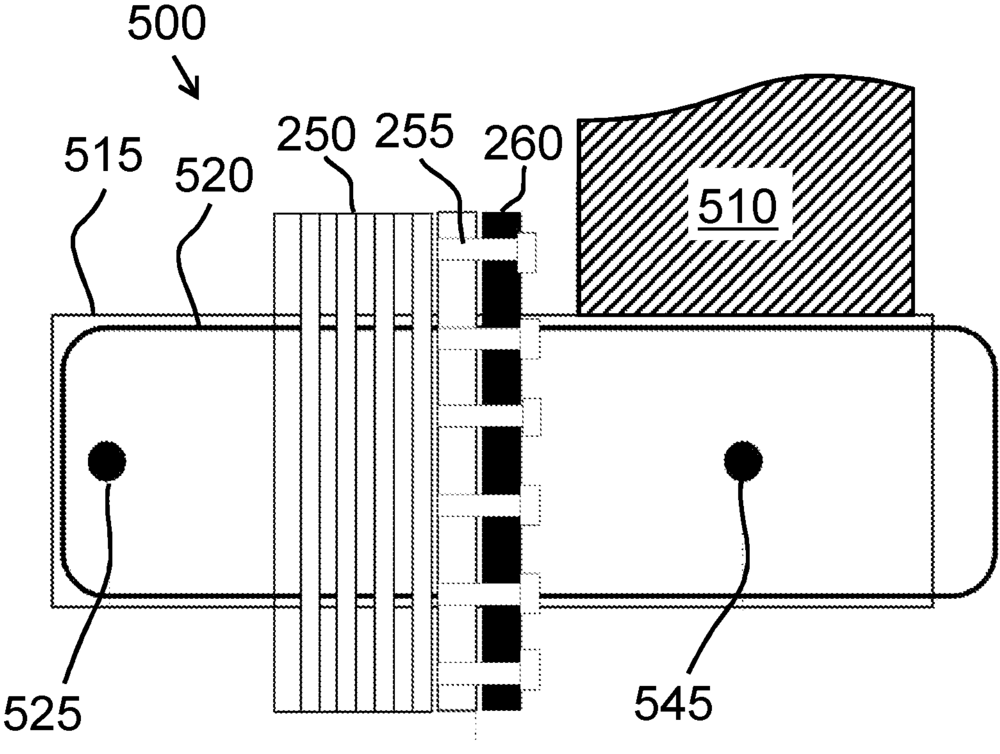
FIG. 5 is a simplified view of a sensor carrier according to a third embodiment of the invention.

Referring now to FIG. 5, there is shown a simplified representation of a landing gear 500, in which a stub axle 515 supports a single wheel or a set of wheels only on one side of a landing gear leg 510. The landing gear 500 incorporates a sensor carrier 520, an end coupling 525 for coupling to a wheel nut (not shown) and a leg coupling 545 for coupling to the portion of the axle 515 adjacent the main leg 510.

Unlike the sensor carrier 220 of FIG. 2 or the sensor carrier 300 of FIGS. 3 and 4, the sensor carrier 520 is arranged to only sense strain occurring between the end coupling 525 and the leg coupling 545. It will therefore be appreciated that current and future landing gear assembly designs having stub axles arranged by themselves or in sets coupled to a bogie may incorporate the embodiment shown in FIG. 5.

Furthermore it will be appreciated that two sensor carriers 520 could be utilised in a conventional two-wheeled axle arrangement, if the two sensor carriers 520 are arranged to mate at the leg coupling 545, with one of the two sensor carriers 520 being smaller than the other so that the smaller end could fit within the larger at the leg coupling 545. This would allow for removal of only one of the two sensor carriers 520 in the case of a component failure. The two sensor carriers 520, when so provided together, could be considered as defining a single sensor pack.

During a braking event, friction between the brakes 250 and the wheel 205 (not shown in FIG. 5) create braking torque which is transferred via connecting pins 255 to the brake torque flange 260. The resulting torque creates shear stress forces at the axle 515, which in turn create torsional deformation (strain) of the axle 515. Such deformation leads to corresponding torsional deformation occurring in the sensor carrier 520 between the wheel nut 525 and central bolt 545, and this strain is sensed by the sensors of the sensor pack 520 (not shown in FIG. 5), which are instrumented to correlate their sensed strain to the strain occurring at the axle 515. In this way the strain occurring at the axle 515 may be determined, such as torsional strain arising from braking torque due to the action of the brakes.

The sensor carrier 520 is be connected wirelessly or via cables (not shown) to the control system (not shown) of the aircraft 101, where the output of the sensor carrier 520 is processed and corresponding electrical or electronic signals are then utilised to provide indications or control inputs to other systems of the aircraft 101.

Figure 6:
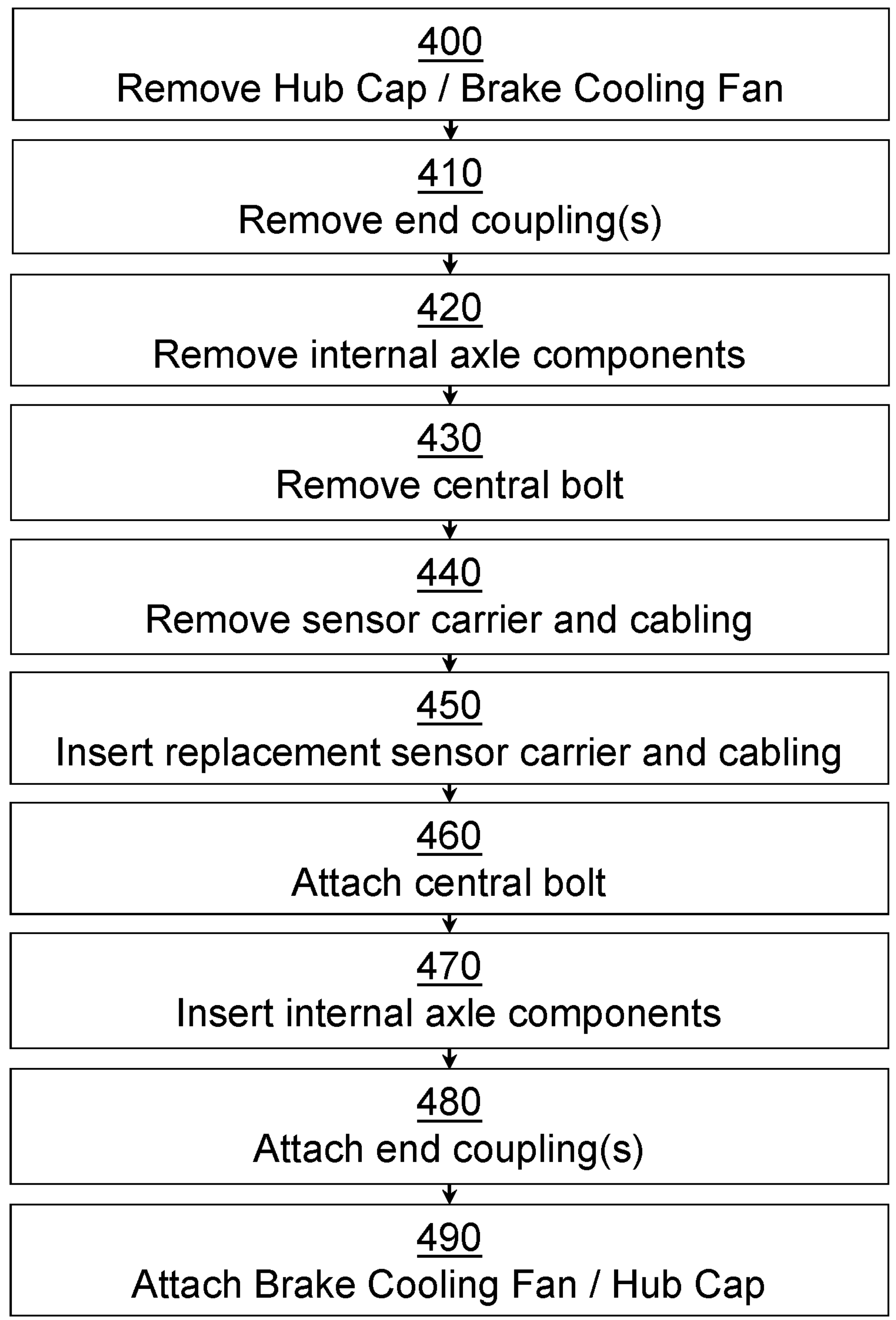
FIG. 6 shows an illustrative flow diagram of a method in accordance with a further embodiment of the invention.

Referring now also to FIG. 6, a method for replacing the sensor carrier 220 in the axle 215 of the aircraft landing gear assembly 200 is shown. Replacement of the sensor carrier 220, 300 or 520 may be necessary if a fault or failure condition should occur. The method starts at box 400, where the hub caps 216 and 217 of the wheels 205 are removed, together with removal of brake cooling fans (not shown) if fitted. At step 410 the wheel nuts 225 and 227 which attach the end couplings of the sensor carrier 220 to the axle 215 are removed.

Internal components of the axle 215 such as a brake cooling fan motor, tachometer and TPIS (if fitted), are then removed at step 420. At step 430 the central bolt 245 is also removed. Then at step 440 the sensor carrier 220 may be removed from the axle 215. Cabling for the sensor carrier 220 may be disconnected either before or after the sensor carrier is removed from the axle 215, depending upon how the cabling is routed and how much length is provided in the cable loom.

A replacement sensor carrier may then be inserted into the axle 215 (step 450). Cabling for the replacement sensor carrier may be attached before or after insertion into the axle 215, again depending upon how the cabling is routed and how much length is provided in the cable loom. The replacement sensor pack may already have been calibrated either on a test-bench or at another aircraft, such that it can be fitted and used immediately, in a so-called 'plug-and-play' manner.

Once the sensor carrier has been inserted, the central bolt 245 is the re-inserted and tightened (step 460). The Internal components of the axle 215 (brake cooling fan motor, tachometer and TPIS), if removed at step 420, are then reinserted into the axle at step 470. The end couplings of the replacement sensor carrier are then attached to the wheel nuts 225 and 227 in step 480.

Finally the hub caps 216 and 217 are replaced in box 490 (after re-attaching brake cooling fans if fitted), after which the arrangement may be tested in order to confirm satisfactory operation. In this way the sensor carrier 220 is a line-replaceable unit, able to be replaced quickly during unscheduled line maintenance if necessary.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

The sensor carrier may have a physical structure other than the tube arrangement of FIG. 2 and the cage arrangement of FIGS. 3 and 4. It may be fabricated using composite material suitable for the landing gear assembly environment, such as PEEK, or a metal such as stainless steel or aluminium. Overall the structure of the sensor carrier and the and material chosen are specified in order that strain occurring at the axle is effectively transferred and sensed by the sensors within the sensor carrier.

Furthermore the sensor carrier 220 may be disposed in any MLG or NLG, including bogie arrangements with multiple axles including stub axles. In the case of a NLG, the sensor carrier 220 would sense vertical and drag strain on the axle but not sense any braking torque, since NLG do not conventionally include brakes.

The number and precise location of sensors within the sensor carriers 220 and 300 may differ from those described above. For example, 4, 8, 32, or 64 sensors could be used in various configurations, depending on cost, redundancy, and accuracy considerations.

The location of the couplings between the axle and the sensor carriers 220 and 300 may differ from those shown in the Figures and described above.

Furthermore, arrangements other than the bolts described above may be employed to anchor the sensor carrier within the axle 215. For example, short bolts could be used which do not extend through the axle 215.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A sensor carrier, comprising:

an elongate carrier body configured to be disposed within an axle of an aircraft landing gear assembly;

a first coupling for coupling the elongate carrier body to a first location of the axle;

a second coupling for coupling the elongate carrier body to a second location of the axle axially spaced apart from the first location of the axle; and at least one sensor disposed on the elongate carrier body and configured to detect strain between the first coupling and the second coupling, wherein said at least one sensor is configured such that when the sensor carrier is within the axle and coupled to the axle by the first and second couplings respectively, strain occurring between the first location and the second location of the axle is detected by said at least one sensor.

2. The sensor carrier of claim 1, wherein said at least one sensor comprises a plurality of sensors arranged within the sensor carrier between the first coupling and second coupling.

3. The sensor carrier of claim 1, further comprising:

a third coupling for coupling the sensor carrier to a third location of the axle axially spaced apart from the first and second locations; and at least one further sensor arranged to detect strain occurring between the second location and the third location of the axle, wherein said at least one further sensor is configured such that when the sensor carrier is coupled to the axle, strain occurring between the second location and the third location of the axle is detected by said at least one further sensor.

4. The sensor carrier of claim 3, wherein the first and third locations are disposed in opposite axial directions away from the second coupling.

5. The sensor carrier of claim 3, wherein said at least one further sensor comprises a plurality of further sensors arranged within the sensor carrier between the second coupling and the third coupling.

6. The sensor carrier of claim 1, wherein the second location of the axle corresponds to a connection between the axle and a landing gear leg.

7. The sensor carrier of claim 6, further comprising at least one central sensor disposed within the sensor carrier proximate to the second coupling, said at least one central sensor being arranged to cooperate with said at least one sensor.

8. The sensor carrier of claim 7, wherein said at least one central sensor comprises a plurality of central sensors arranged within the sensor carrier proximate the second coupling.

9. The sensor carrier of claim 1, wherein the strain detected by the sensor carrier includes torsional strain relating to the braking action of wheels attached to the axle.

10. The sensor carrier of claim 1, wherein the strain detected by the sensor carrier includes vertical strain caused by forces acting on the axle during landing and take-off of the aircraft.

11. The sensor carrier of claim 1, further comprising a plurality of further sensors arranged within the sensor carrier which, together with said at least one sensor, are arranged (a) to detect strain between the first coupling and the second coupling, (b) to detect torsional strain relating to the braking action of wheels attached to the axle and (c) to detect vertical strain caused by forces acting on the axle during landing and/or take-off of the aircraft.

12. The sensor carrier of claim 1, wherein the sensor carrier also includes at least one of: a wheel speed tachometer; a brake cooling fan motor; and a tire pressure indicating system.

13. The sensor carrier of claim 1, wherein the sensor carrier is made of composite material.

14. A landing gear assembly comprising the sensor carrier of claim 1.

15. An aircraft comprising the landing gear assembly according to claim 14.

16. A method for determining forces acting on an axle of an aircraft landing gear assembly, the method comprising:

an elongate carrier body configured to be disposed within the axle of an aircraft landing gear assembly;

sensing strain occurring at a sensor pack disposed on the elongate carrier body, the sensor pack being coupled between two axially spaced apart locations of the axle, wherein the sensed strain at the sensor pack provides an indication of strain occurring between the two axially spaced apart locations of the axle.

17. The method of claim 16, including a step of a processor using an input representative of the sensed strain at the sensor pack to provide an output of a braking torque and/or vertical loads at the axle, with the use of a relationship that relates the strains directly sustained by structure of the sensor pack, and sensed by the sensors of the sensor pack, to said braking torque and/or vertical loads.

18. The method of claim 17, wherein the inputs used by the processor include inputs from at least three strain sensors distributed internally within the sensor pack and mounted on structure of the sensor pack to measure strain directly sustained by said structure of the sensor pack.

19. A method for replacing a sensor pack, the sensor pack being in form of an elongate carrier body disposed within an axle of an aircraft landing gear assembly, wherein the sensor pack is coupled between two axially spaced apart locations of the axle, the method comprising:

decoupling the sensor pack from the two axially spaced apart locations of the axle;

removing the sensor pack from the axle;

inserting a replacement sensor pack in the axle; and coupling the replacement sensor pack to the two axially spaced apart locations of the axle.

20. The method of claim 19, further comprising the step of, prior to step of inserting, calibrating the replacement sensor pack.

* * * * *